United States Patent [19]

Igaku

[11] Patent Number: 5,098,358
[45] Date of Patent: Mar. 24, 1992

[54] UNIFIED ASYMMETRIC PLANETARY GEAR ASSEMBLY

[75] Inventor: Shoji Igaku, Nara, Japan

[73] Assignee: Matex Co., Ltd., Osaka, Japan

[21] Appl. No.: 403,180

[22] Filed: Sep. 5, 1989

[30] Foreign Application Priority Data

Oct. 16, 1987 [JP] Japan .................... 62-262274

[51] Int. Cl.$^5$ .......................................... F16H 1/28
[52] U.S. Cl. ......................... 475/335; 475/345; 74/DIG. 10
[58] Field of Search ............. 475/331, 334, 335, 345; 74/DIG. 10

[56] References Cited

U.S. PATENT DOCUMENTS

| | | | |
|---|---|---|---|
| 801,517 | 10/1905 | Fairfax | 475/331 X |
| 1,425,430 | 8/1922 | Wikander | 475/335 |
| 1,586,309 | 5/1926 | Hult | 475/335 |
| 1,970,251 | 8/1934 | Rossman | 475/335 |
| 3,216,270 | 11/1965 | Nasvytis | 74/410 |
| 3,293,928 | 12/1966 | Heister | 74/64 |
| 3,316,004 | 1/1968 | Williams et al. | 74/DIG. 10 X |
| 3,330,171 | 7/1967 | Nosvytis | 475/335 X |
| 3,421,390 | 1/1969 | Lohr | 475/331 X |
| 3,457,234 | 7/1969 | Gianatasio | 74/DIG. 10 X |
| 3,578,673 | 12/1970 | Suchocki | 74/409 |
| 3,789,700 | 2/1974 | Cotreau et al. | 74/640 X |
| 4,043,021 | 8/1977 | Mosbacher et al. | 475/331 X |
| 4,109,545 | 8/1978 | Hayasaka | 74/447 |
| 4,237,175 | 12/1980 | Kobayashi | 74/DIG. 10 X |
| 4,617,839 | 10/1986 | Matoba | 74/335 |
| 4,674,360 | 6/1987 | Matoba | 475/331 X |
| 4,838,123 | 7/1989 | Matoba | 475/335 |

FOREIGN PATENT DOCUMENTS

| | | |
|---|---|---|
| 46125 | 7/1986 | Australia . |
| 444697 | 5/1927 | Fed. Rep. of Germany . |
| 1107062 | 3/1968 | Fed. Rep. of Germany . |
| 2032723 | 4/1971 | Fed. Rep. of Germany . |
| 30-16918 | 11/1955 | Japan . |
| 54-17111 | 6/1979 | Japan . |
| 57-127145 | 8/1982 | Japan .................... 475/335 |
| 57-41486 | 9/1982 | Japan . |
| 57-48702 | 10/1982 | Japan . |
| 58-94656 | 6/1983 | Japan . |
| 60-14637 | 1/1985 | Japan .................... 475/331 |
| 60-34553 | 2/1985 | Japan . |
| 60-252845 | 12/1985 | Japan . |
| 60-260738 | 12/1985 | Japan .................... 475/335 |
| 61-27337 | 2/1986 | Japan . |
| 61-206853 | 9/1986 | Japan . |
| 2189569 | 10/1987 | United Kingdom ........ 475/335 |

*Primary Examiner*—Leslie A. Braun
*Assistant Examiner*—Benjamin Levi
*Attorney, Agent, or Firm*—Cushman, Darby & Cushman

[57] ABSTRACT

A planetary gear includes a middle planetary gear part, a disc part on one side of the planetary gear part having a radius smaller than a radius of the tooth root circle of the planetary gear part and another disc part on another side of the planetary gear part having a radius bigger than a radius of a tooth edge circle of the planetary gear part. An internal gear includes a middle internal gear part, an inner cylindrical part on one side of the internal gear having a radius smaller than a radius of a tooth edge circle of the internal gear part and another inner cylindrical part on another side of the internal gear having a radius bigger than a radius of a tooth root circle of the internal gear part. The planetary smaller disc parts can rollingly engage the smaller inner cylindrical part of the internal gear. The planetary bigger disc parts can rollingly engage the bigger inner cylindrical part of the internal gear. The planetary gear part and two disc parts are unified in a body. Unification of the planetary gear reduces the cost of manufacturing and assembling and additionally, alleviates noise generation from the operating assembly.

15 Claims, 11 Drawing Sheets

UNIFIED ASYMMETRIC PLANETARY GEAR ASSEMBLY

BACKGROUND OF THE INVENTION

This invention relates to a planetary gear assembly which has wide applications as decelerator or accelerator, especially to an asymmetric planetary gear assembly with unified asymmetric planetary gears and an asymmetric internal gear.

A planetary gear assembly comprises a sun gear, three or four planetary gears, an internal gear and a carrier. At six or eight points, planetary gears mesh with a sun gear and an internal gear. The number of engagement points exceeds the number of parts. Therefore, it is difficult to equalize all of transmitting forces acting upon the engagement points. Even very small errors are likely to make the transmitting forces uneven. Uneven engagement means a too deep engagement on one hand and a too shallow engagement on the other hand. Heightening the accuracy of finishing of the gears does not necessarily lead to a fruitful result. Deep engagement between the planetary gears and the sun gear or the internal gear causes increased vibration, noise and energy loss.

Ordinary planetary gear assemblies utilize simple gears without side discs. To solve the problem of uneven engagement, improved planetary gear assemblies having planetary gears with discs and an internal gear with rings on both sides or on one side thereof, have been proposed. In such an improved assembly, the diameters of the planetary discs or the internal rings are equal to the diameters of pitch circles of the planetary gears or the internal gear, respectively.

A pitch circle is a circle which properly represents the size of a gear. Roughly speaking, the pitch circle is a circle obtained by connecting middle points of the gear teeth between the tooth roots and the tooth edges. In other words, if two engaging gears would be replaced by friction wheels (e.g. discs or rings) without changing the rotation ratio or distance between the gear shafts, the friction wheels would represent the size of the pitch circles. Although it is rather difficult to define the pitch circle, the pitch circle has a definite significance. One conventional method of gear design is based on a "module system." A module is the ratio of pitch diameter to the number of gear teeth. The module of a gear is designated by "m". The number of gear teeth is designated by "Z". The diameter D of the pitch circle is given by $$D = mZ \tag{1}$$

$$\text{Thus, } m = D/Z \tag{1b}$$

The module "m" is a parameter which represents the thickness of a tooth. Two gears with different modules "m" or different pressure angles "α" cannot mesh together.

A circle which connects the tooth edges of a gear is called a tooth edge circle. Although a basic gear tooth profile can be varied in the module system, one conventional tooth profile standard sets the distance between the pitch circle and the tooth edge circle at 1 module. Therefore, in the case of outer-toothed gears, the tooth edge circle is 1 module greater than the pitch circle in radius. In the case of inner-toothed gears, the tooth edge circle is 1 module smaller than the pitch circle in radius.

Namely, the diameter E of the tooth edge circle is given by $$E = m(Z \pm 2) \tag{2}$$

where outer-toothed gears employ the upper sign and inner-toothed gears employ the lower sign.

A circle which connects tooth roots of a gear is called a tooth root circle. The conventional tooth profile standard mentioned above sets the distance between the pitch circle and the tooth root circle at 1.25 modules. In the case of outer-toothed gears, the tooth root circle is 1.25 modules smaller than the pitch circle in radius. In the case of inner-toothed gears, the tooth root circle is 1.25 modules bigger than the pitch circle in radius.

Namely, the diameter F of a tooth root circle is given by $$F \mathrel{I} m (Z \pm 2.5) \tag{3}$$

where outer-toothed gears employ the upper sign and inner-toothed gears employ the lower sign.

If discs or rings whose diameters are equal to that of the pitch circles are fitted on the sides of the gears, radial forces are transmitted through the pitch discs or pitch rings.

Therefore, in the planetary gear assemblies with pitch discs and rings, even if the sun gear shaft is eccentric, the planetary shafts deviate from exact points on the carrier or the output shaft is eccentric, the gears don't excessively mesh with each other, because excess radial displacements are forbidden by the pitch discs and rings.

There is an important reason why the discs or rings fitted on the sides of the gears must be the same diameter as the pitch circles or pitch rings. As mentioned before, if two engaging gears would be replaced by two contacting friction wheels, only friction wheels with pitch circle diameters the same as the replaced gears would give the same rotation ratio, without changing the distance between shafts. Therefore, when two gears having pitch discs or pitch rings on their sides are meshed with each other, no slipping occurs between the pitch rings or pitch discs.

A lot of planetary gear assemblies with pitch discs or pitch rings have been invented so far. Such planetary gear assemblies are now called a "pitch circle type", examples of which can be seen in the following references.

(1) U.S. Pat. No. 3,293,928 (Dec. 27, 1966)
(2) U.S. Pat. No. 3,548,673 (Dec. 22, 1970)
(3) U.S. Pat. No. 3,789,700 (Feb. 5, 1974)
(4) U.S. Pat. No. 1,970,251 (Aug. 14, 1934)
(5) U.S. Pat. No. 1,586,309 (May 25, 1926)
(6) U.S. Pat. No. 3,216,270 (Nov. 9, 1965)
(7) German Patent Publication 2,032,723 (Apr. 13, 1972)
(8) British Patent 1,107,062 (Jun. 16, 1965)
(9) U.S. Pat. No. 3,330,171 (Jul. 11, 1967)
(10) German patent 444,697 (May 24, 1927)
(11) U.S. Pat. No. 1,425,430 (Aug. 8, 1922)
(12) Japanese Utility Model Publication No. 30-16918 (Nov. 18, 1955)
(13) Japanese Patent Publication No. 54-17111 (Jun. 27, 1979)

(14) Japanese Utility Model Publication No. 57-41486 (Sep. 11, 1982)

(15) Japanese Patent Publication No. 57-48702 (Oct. 18, 1982)

(16) U.S. Pat. No. 4,109,545 (Aug. 29, 1978)

The uniqueness of the pitch circle type of planetary gear assembly will now be explained. The pitch circle is a unique circle for every gear. Only gears having pitch discs or rings don't slip each other at the contact points, because line velocities of the discs and rings are equal at the contact points.

If engaging gears would have contacting side discs or rings with diameters other than the pitch circle, the line velocities of the discs or rings would be different at the contact points.

If the line velocities of the side discs or rings are equal, no slipping occurs at the contact points. If the line velocities of the discs or rings are not equal, slipping does occur at the contact points. Slipping between side discs and rings causes energy losses.

It is conventionally thought that the pitch circle type planetary gear assembly should have excellent energy loss characteristics, since no slipping occurs at the contact points. This is an important matter which will be explained in more detail.

It is assumed that an outer-toothed gear P with a tooth number $Z_p$ meshes with an inner-toothed gear I with a tooth number $Z_1$ at a point C. The module of the gears is denoted by "m". Centers of the outer-toothed gear P and the inner-toothed gear I are designated by "$O_p$" and "$O_1$", respectively.

The pitch diameter D, of the gear P is defined by $$D_p = m Z_p \quad (4)$$

The pitch diameter D of the gear I is defined by $$D_1 = m Z_1 \quad (5)$$

When the two gears mesh each other, the contact point C must lie on both pitch circles of the gears. Namely, the two pitch circles of the two gears contact each other at the contact point C.

The distances $O_p C$ and $O_1 C$ between the contact point C and the centers $O_p$ and $O_1$ are expressed by $$O_p C = D_p / 2 \quad (6)$$

$$O_1 C = D_1 / 2 \quad (7)$$

Because the two pitch circles contact at the contact point C, the three points $O_p$, $O_1$, and C must lie on the same straight line.

The distances $O_1 O_p$ between the centers of the gears is calculated by $$O_1 O_p = (D_1 - D_p) / 2 \quad (8)$$

$$m(Z_1 - Z_p) / 2 \quad (9)$$

The angular velocities of the outer-toothed gear P and the inner-toothed gear I are denoted by $\Omega_p$ and $\Omega_1$, respectively. Here, counterclockwise rotation is determined to be positive regarding angular velocity.

Because the line velocities are equal at the contact point, the products of angular velocity and tooth number are equal.

$$Z_p \Omega_p = Z_1 \Omega_1 \quad (10)$$

This equation means that angular velocity is inversely proportional to tooth number. This is a well-known relation.

If the outer-toothed gear P has side discs whose outer radius is $R_p$ and the inner-toothed gear I has side rings whose inner radius is $R_1$ and the side discs and rings contact each other, the difference of radius $$R_1 - R_p = O_1 O_p \quad (11)$$
$$= (D_1 - D_p)/2$$

The line velocity of the disc $R_p$ at the contact point is $R_p \Omega_p$. The line velocity of the ring $R_1$ at the contact point is $R_1 \Omega_1$. The difference W between the line velocities $V_p$ of the disc $R_p$ and $V_1$ of the ring $R_1$ is calculated by $$V_p = R_p \Omega_p \quad (12)$$

$$V_1 = R_1 \Omega_1 \quad (13)$$

$$W = V_p - V_1 \quad (14)$$
$$= R_p \Omega_p - R_1 \Omega_1$$

If $R_p$ is a pitch disc and $R_1$ is a pitch ring, $R_p = D_p/2$ and $R_1 = D_1/2$. Thus, the difference w of the line velocities is zero.

Otherwise, it is assumed that $R_p$ is greater than the pitch disc by $\Delta$ and $R_1$ is smaller than the pitch ring by $\Delta$.

$$R_p = \frac{D_p}{2} + \Delta \quad (15)$$

$$R_1 = \frac{D_1}{2} + \Delta \quad (16)$$

The reason why both deviations have plus sign in Eq. (15) and (16) is that the contact condition of Eq. (11) must be kept.

Substituting Eq. (15) and (16) into Eq. (14), we obtain $$W = (D_p \Omega_p - D_1 \Omega_1)/2 + \Delta(\Omega_p - \Omega_1) \quad (17)$$

From Eq. (4), Eq. (5) and Eq. (10), the first term of Eq. (17) becomes zero. Then the difference W of line velocities is $$W = \Delta(\Omega_p - \Omega_1) \quad (18)$$

When $R_p$ and $R_1$ are a pitch disc and a pitch ring, the difference W is zero, because $\Delta = 0$. But if $\Delta$ is not zero, W is not zero. In this case, the line velocity $V_p$ of the disc $R_p$ differs from the line velocity $V_1$ of the ring $R_1$ at the contact point C.

To equalize the line velocities of the two friction wheels (disc or ring) at the contact point, the diameters of the friction wheels must be equal to that of the pitch circles. If the line velocities are different, the friction wheels must slip at the contact point. Slipping causes increased energy losses and noise. If the friction force is too large, the rotation of gears would be stopped, because the difference of line velocities is likely to damp the rotation of the counterpart wheels.

The above is the conventional thought about gear engagement. Therefore, conventional side friction wheels (discs or rings) have been pitch circle wheels without exception. FIG. 8 (PRIOR ART) shows an example of a planetary gear (80) with side discs (81) having the same diameter as the pitch circle (82).

However, side discs and rings do not always contact each other. Sometimes the side discs and rings are separated. The time length of separation can be longer than the time length of contact.

It was thought that the discs or rings did not necessarily need to be pitch circle ones. Thus, a new type of planetary gear assembly was invented which is called a "tooth edge circle type." It is disclosed in Japanese Patent Application No. 56-193113, Japanese Patent Laying Open 58-94656 (Laid open on June 4, 1983).

FIG. 7 shows a planetary gear (70) of a tooth edge circle type. The gear (70) has two discs (71) on both sides and a pitch circle (72). These side discs (71) are not pitch discs. But they are larger in diameter than the tooth edge circle (73) of the gear (70). As a counterpart, an internal gear has two side inner cylindrical surfaces. The inner surfaces are bigger than the tooth root circle of the gear. In the tooth edge circle type, an internal gear can be formed in a single body, because side inner cylindrical surfaces are bigger than the tooth root circle. Then the tooth edge circle type has an advantage in that the number of parts can be reduced.

At first, it was considered doubtful whether such a planetary gear assembly could really rotate, because both planetary side discs and internal side surfaces deviated from the pitch circles. Then such tooth edge circle type gears were constructed and inspected to determine whether they could rotate. Indeed, the planetary gear assembly rotated smoothly.

There had been one anxiety. In the tooth edge type of planetary gear assembly having non-pitch circle discs or rings, the line velocities of the discs or rings were different and, it was believed that the discs or rings would produce a braking effect on their counterparts at the contact point. But the test results clearly denied such anxiety. The tooth edge type of gear rotated smoothly without energy loss.

It was concluded that the smooth rotation perhaps derives from the fact that the disc surface of the planetary gear and the inner cylindrical surfaces of the internal gear do not always contact nor slip each other.

Two modified planetary gear assemblies have been mentioned so far, pitch circle type and tooth edge circle type. Both pitch circle type and tooth edge circle type are plane-symmetric regarding the central plane. In the case of the tooth edge circle type, a planetary gear has two equivalent discs on both sides.

On the contrary, another new asymmetric type of planetary gear assembly is not symmetric with regard to the central plane of gears. The asymmetric planetary gear has been disclosed in the following references:

(1) Japanese Patent Application No. 58-143466 Filed on Aug. 5, 1983
Japanese Patent Laying Open No. 60-34553 Laid Open on Feb. 22, 1985
(2) Japanese Patent Application No. 59-106976 Filed on May 26, 1984
Japanese Patent Laying Open No. 61-252845 Laid Open on Dec. 13, 1985
(3) Japanese Patent Application No. 59-150145 Filed on Jul. 19, 1984
Japanese Patent Laying Open No. 61-27337 Laid Open on Feb. 6, 1986

(Equivalent Foreign Patents; U.S. Pat. No. 4,617,839, Australian Patent 553,968)

The new planetary gear assembly provides a disc on only one side of the planetary gear. It is rather imperfect.

Other new planetary gear assemblies provide two discs on both sides of the planetary gear. One side disc is larger in diameter than the tooth edge circle. Another side disc is smaller in diameter than the tooth root circle. Correspondingly, an internal gear is provided with two side inner cylindrical surfaces. One inner cylindrical surface is bigger in diameter than the tooth root circle of the internal gear. Another inner cylindrical surface is smaller in diameter than the tooth edge circle of the internal gear. The side discs of the planetary gears contact with and roll on the side inner cylindrical surfaces.

The line velocities of the side disc planetary gears are different from the line velocities of the inner cylindrical surfaces of the internal gear. It is not a simple difference. The differences of line velocities between the discs and inner surfaces are in reverse relation on a right hand side and a left hand side. For example, if the line velocity of the discs is bigger than that of the inner surface on the right hand side, the line velocity of the discs is smaller than that of the inner surface on the left hand side.

It was doubtful whether such an asymmetric planetary gear assembly could rotate without friction loss.

In practice, an asymmetric planetary gear assembly was constructed and tested. The asymmetric planetary gear assembly rotated smoothly, against expectation.

In the case of the asymmetric type, a sun gear shaft can be inserted from a vacant side after construction of the gear assembly. Further, the sun gear has a side cylindrical part. The side cylindrical part determines the proper position of the sun gear among the several planetary gears because the sun cylindrical part contacts all the planetary discs. Thus, the sun cylindrical part prevents an abnormal fitting of the sun gear with the planetary gears.

The asymmetric type has such advantages. A planetary gear includes three parts, a gear and two side discs. There are some clearances among the three parts. Owing to these clearances, the three parts are allowed free relative rotation.

Although the differences of the line velocities between the planetary discs and the inner cylindrical surface are different on the right hand side and left hand side, free relative rotation of the three parts of the planetary gear enables the asymmetric planetary gear assembly to rotate freely.

The above-mentioned asymmetric type as well as the tooth edge type are provided with the planetary gears having a central gear and two side discs. The fact that a planetary gear has three parts increases the cost for the parts and construction.

If the planetary gear can be made in a single body, the cost for the parts and construction would be decreased.

Because three or four planetary gears are used in an assembly, the cost reduction by reducing the number of parts would be multiplied and would be desirable.

In the pitch circle type, a conventional planetary gear has a middle gear and two side pitch discs. However, such a simplified planetary gear would be unbalanced.

In the tooth edge circle type, a conventional planetary gear has three parts without fail.

In these types, a planetary gear cannot be made in a single body. This fact increases part and construction cost.

Accordingly, it is a primary object of this invention to provide a planetary gear assembly including planetary gears which have a gear part and side disc parts unified in a body. A unified planetary gear would reduce part and construction cost.

To unify the three parts of the planetary gear, the planetary gears and the internal gear must be asymmetric with regard to the central plane vertical to the gear axis.

The prior asymmetric planetary gears disclosed by Japanese Patent Laying Open No. 60-252845 and No. 61-27337, were asymmetric in order to insert a sun gear unified with a shaft among the planetary gears after construction.

However, symmetry of the gears of this invention does not aim to inserting a sun gear shaft after construction. But an asymmetric shape of gears are an inevitable result of unifying a planetary gear part and two disc parts in a body. The asymmetry of this invention has no connection with the possibility of inserting a sun gear shaft.

It is a further object of this invention to provide a planetary gear assembly with a high efficiency of torque transmission.

Another object of this invention is to provide an improved planetary gear assembly with decreased noise and vibration generation.

SUMMARY OF THE INVENTION

To achieve the foregoing objects, the unified asymmetric planetary gear assembly of the present invention comprises a sun gear, a plurality of planetary gears meshing with the sun gear, an internal gear meshing with the planetary gears, a carrier rotatably supporting the planetary gears with planetary shafts, wherein the planetary gear comprises a planetary gear part in the middle, a planetary smaller disc part having a radius smaller than the radius of the tooth-root circle of the planetary gear part on a side thereof, a planetary bigger disc part having a radius bigger than the radius of the tooth edge circle of the planetary gear part on another side thereof and a planetary boss axially perforated with a shaft hole, the planetary gear part, the planetary smaller disc part, the planetary bigger disc part and the planetary boss being unified in a body; the internal gear includes an internal gear part meshing with the planetary gear part, a smaller inner cylindrical part having a radius smaller than the radius of the tooth edge circle of the internal gear part on a side thereof and a bigger inner cylindrical part having a radius bigger than the radius of the tooth root circle of the gear part on another side thereof, the planetary smaller disc parts rolling on the smaller inner cylindrical part and the planetary bigger disc parts rolling on the bigger inner cylindrical part.

Preferably, the planetary smaller disc part is 0 to 2 modules smaller in radius than the radius of the tooth root circle of the planetary gear part and the smaller inner cylindrical part is 0 to 2 modules smaller in radius than the tooth edge circle of the inner gear part.

It is also preferred that the planetary bigger disc part is 0 to 2 modules bigger in radius than the radius of the tooth edge circle of the planetary gear part and the bigger inner cylindrical part is 0 to 2 modules bigger in radius than the radius of the tooth root circle of the inner gear part.

BRIEF DESCRIPTION OF THE DRAWINGS

The accompanying drawings which are incorporated in and constitutes part of this specification, illustrate embodiments of the invention and together with the description, serve to explain the principles of the invention.

Figure 1:
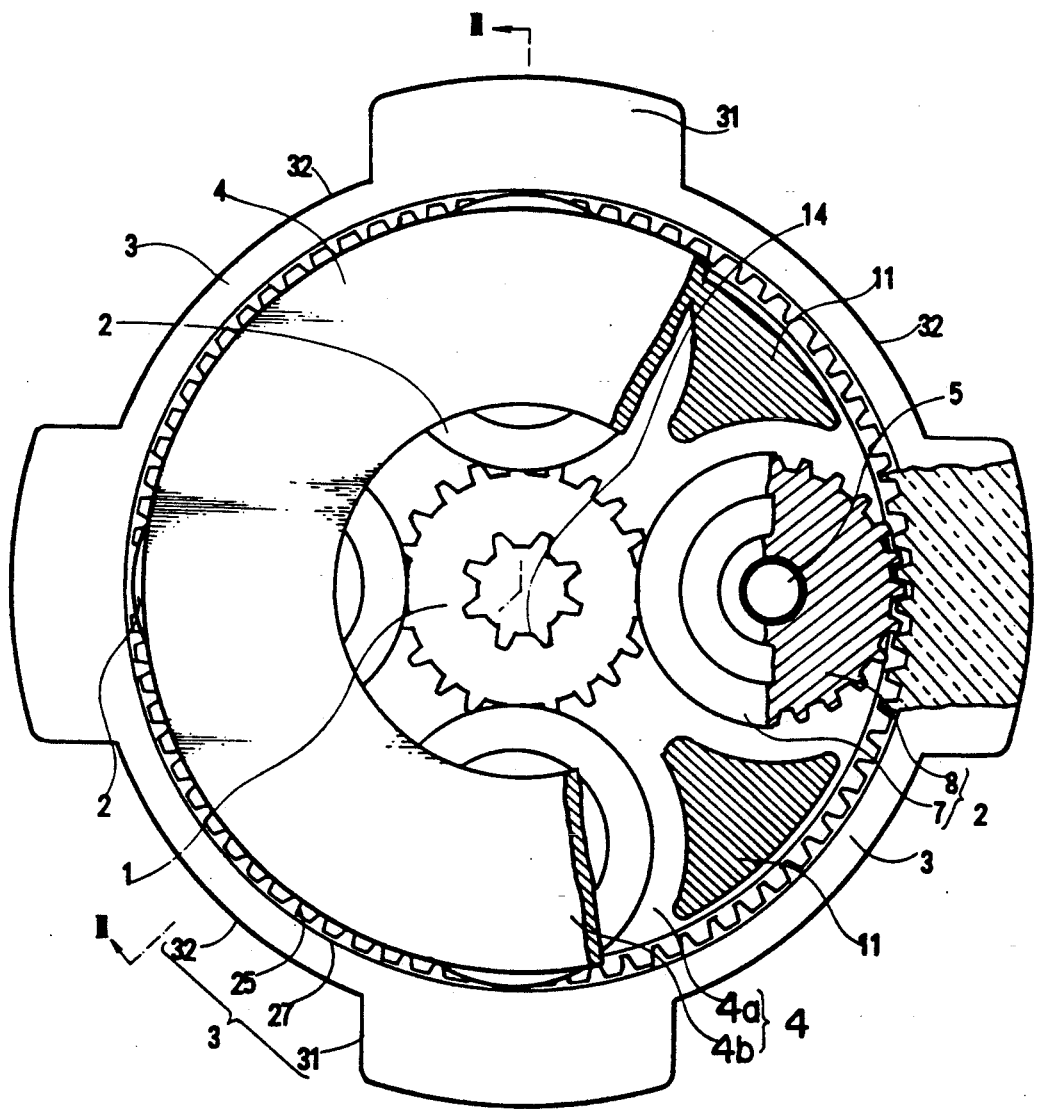

IN THE DRAWINGS:

FIG. 1 is a partially sectioned front view of a unified asymmetric planetary gear assembly as an embodiment of the invention.

Figure 2:
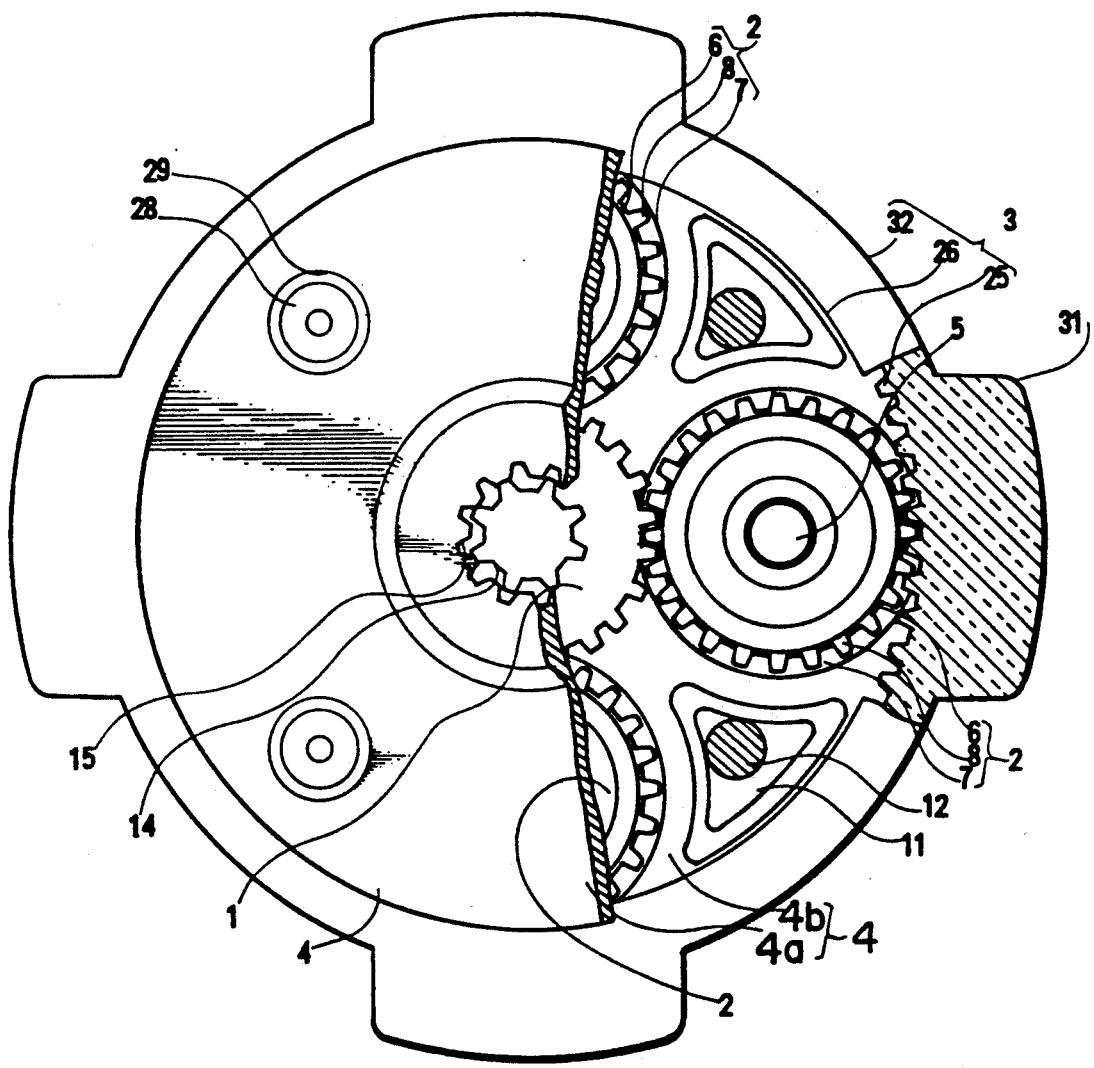

FIG. 2 is a partially sectioned rear view of the embodiment.

Figure 3:
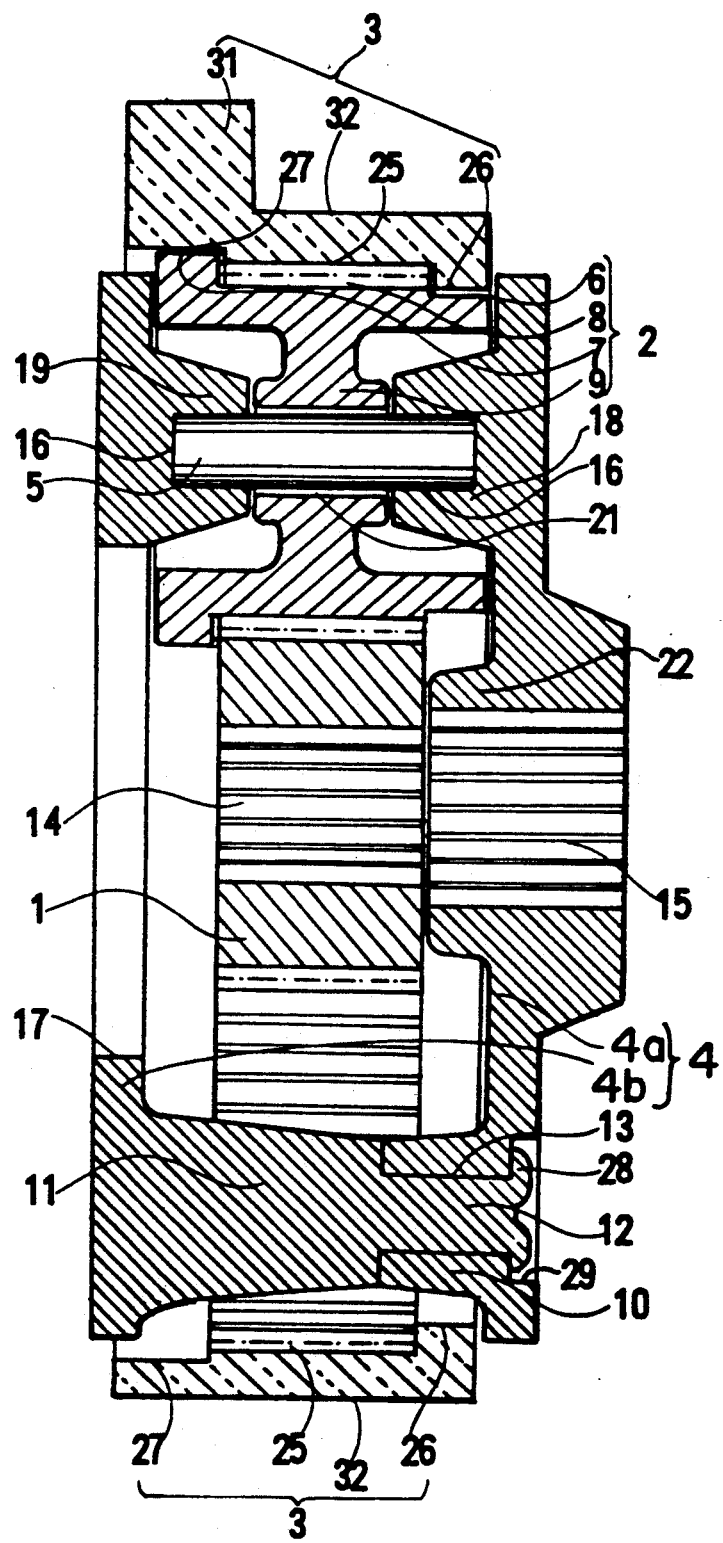

FIG. 3 is a sectional view taken along a line III—III in FIG. 1.

Figure 4:
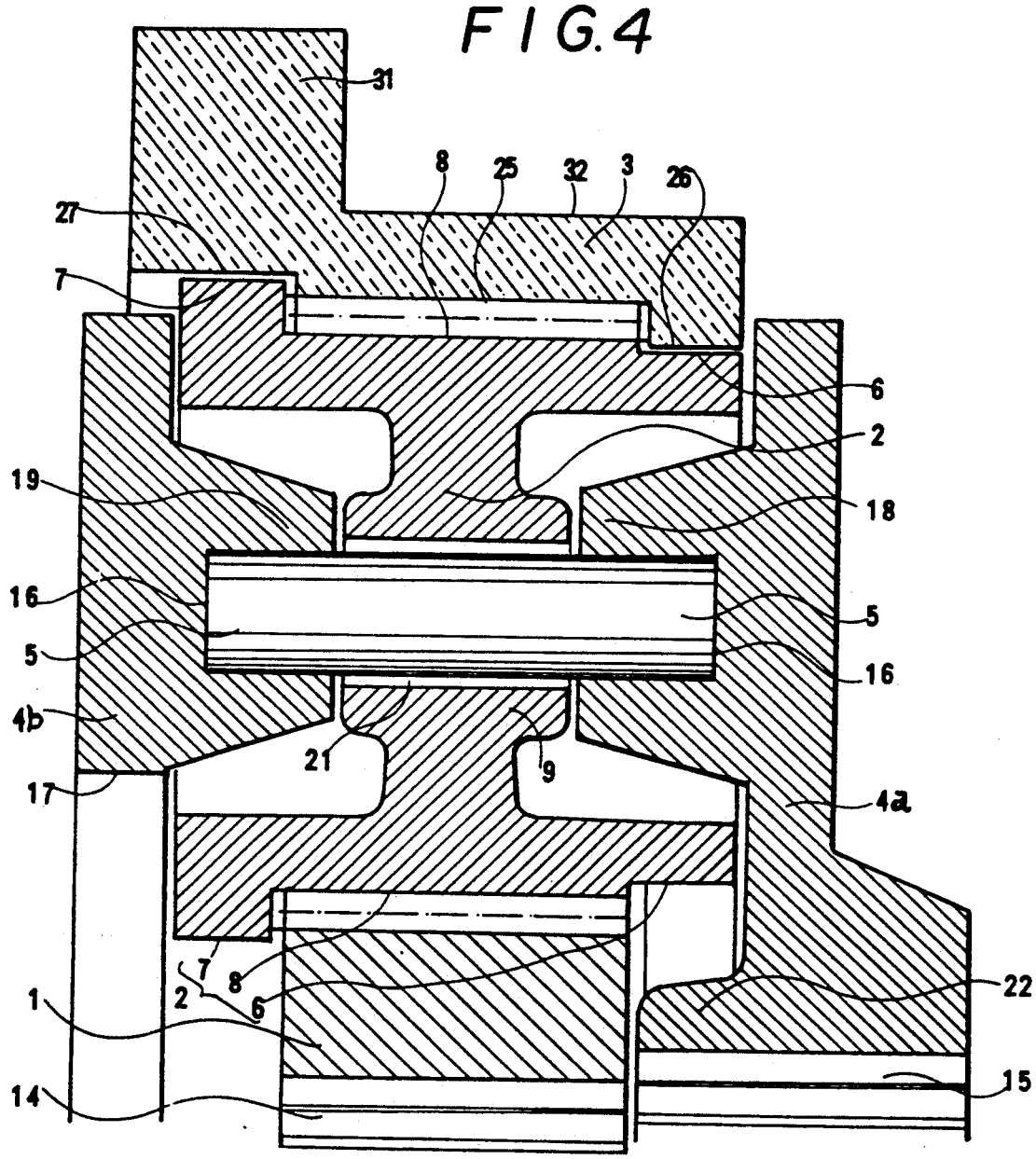

FIG. 4 is an enlarged sectional view of a planetary gear in FIG. 3.

Figure 5:
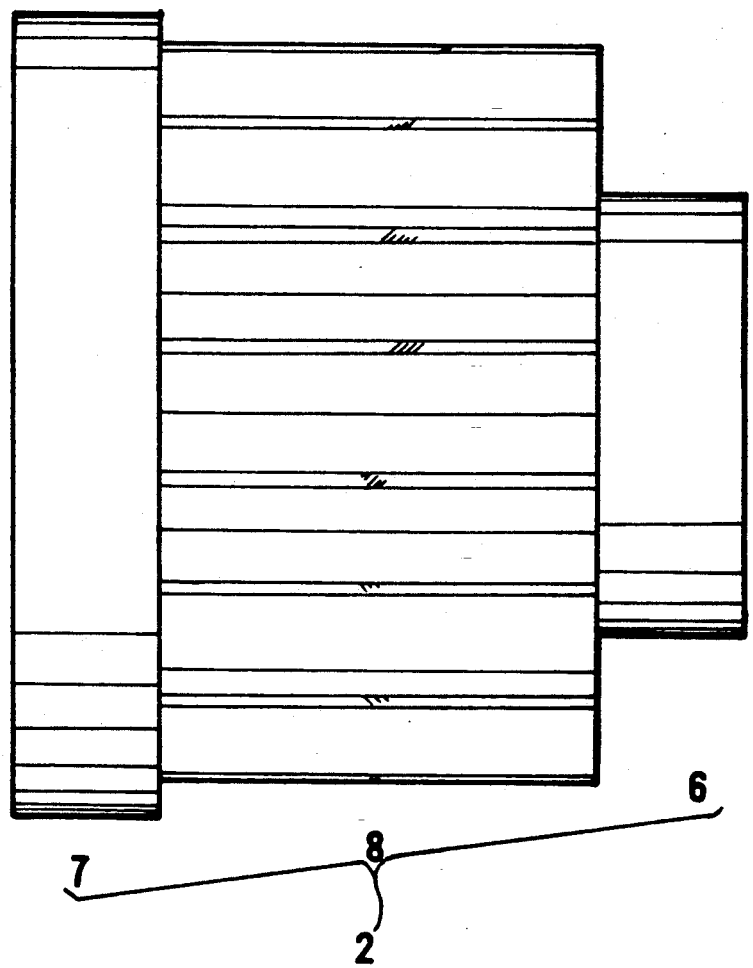

FIG. 5 is a front view of a planetary gear.

Figure 6:
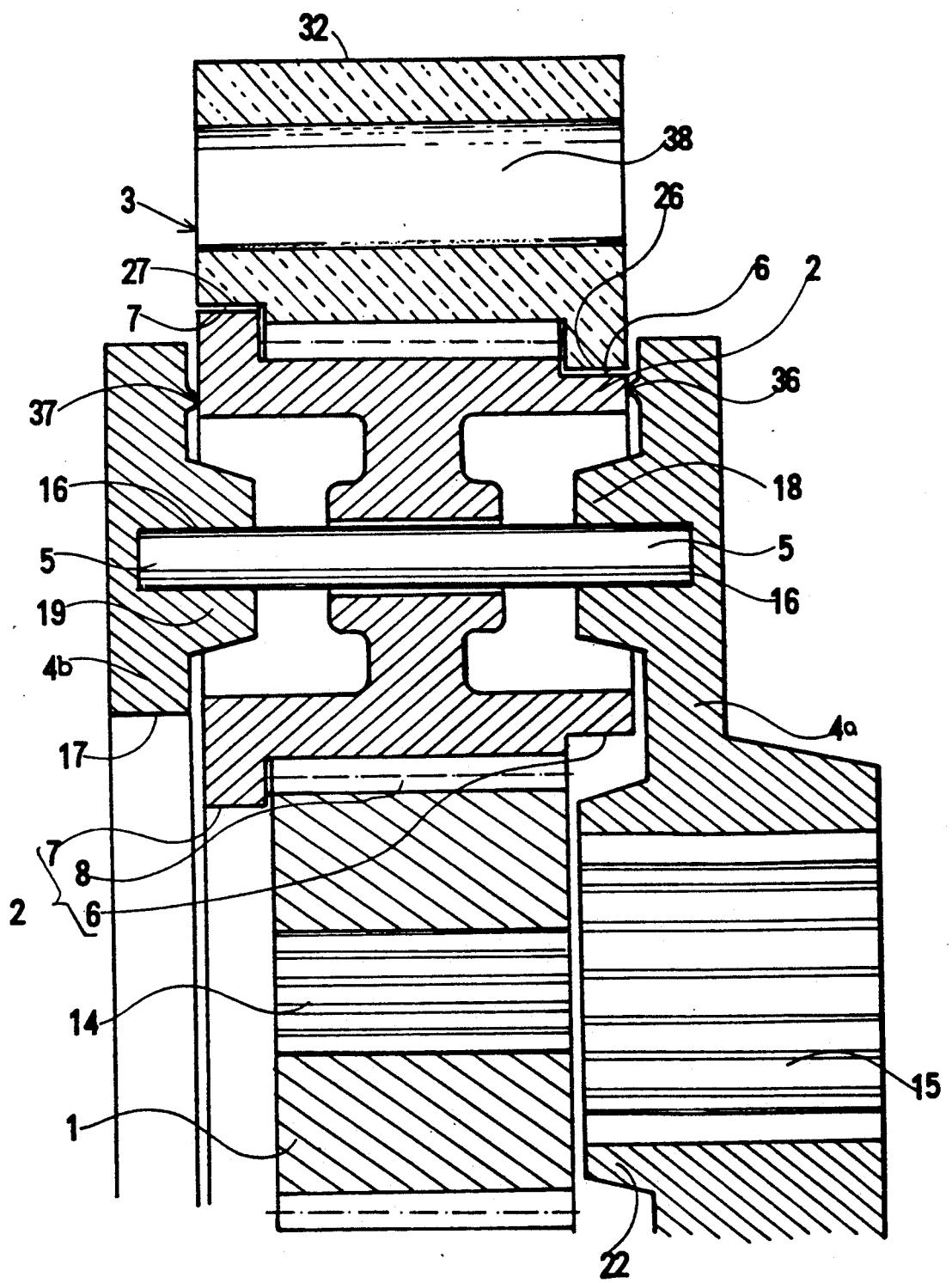

FIG. 6 is a sectional view near a planetary gear of another embodiment of this invention.

Figure 7:
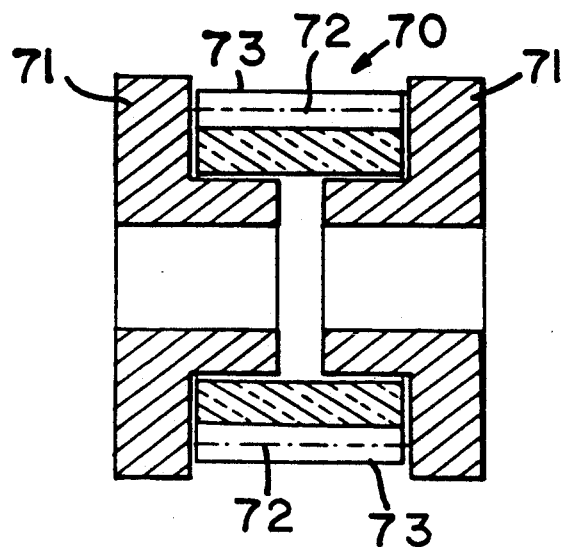

FIG. 7 a sectional view of a planetary gear of the tooth edge type.

Figure 8:
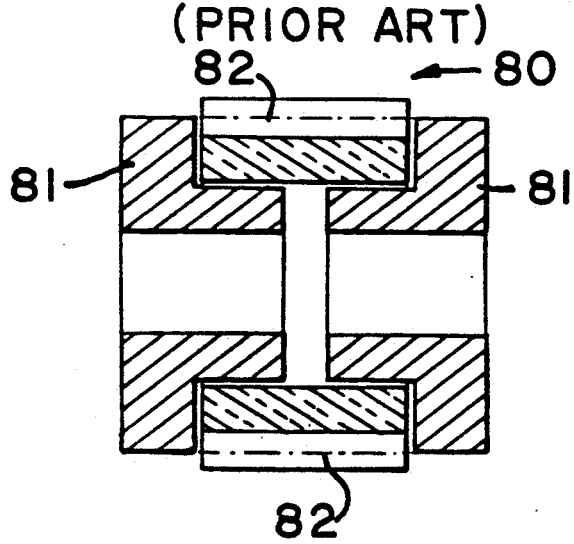

FIG. 8 (PRIOR ART) is a sectional view of a planetary gear of the pitch circle type.

Figure 9:
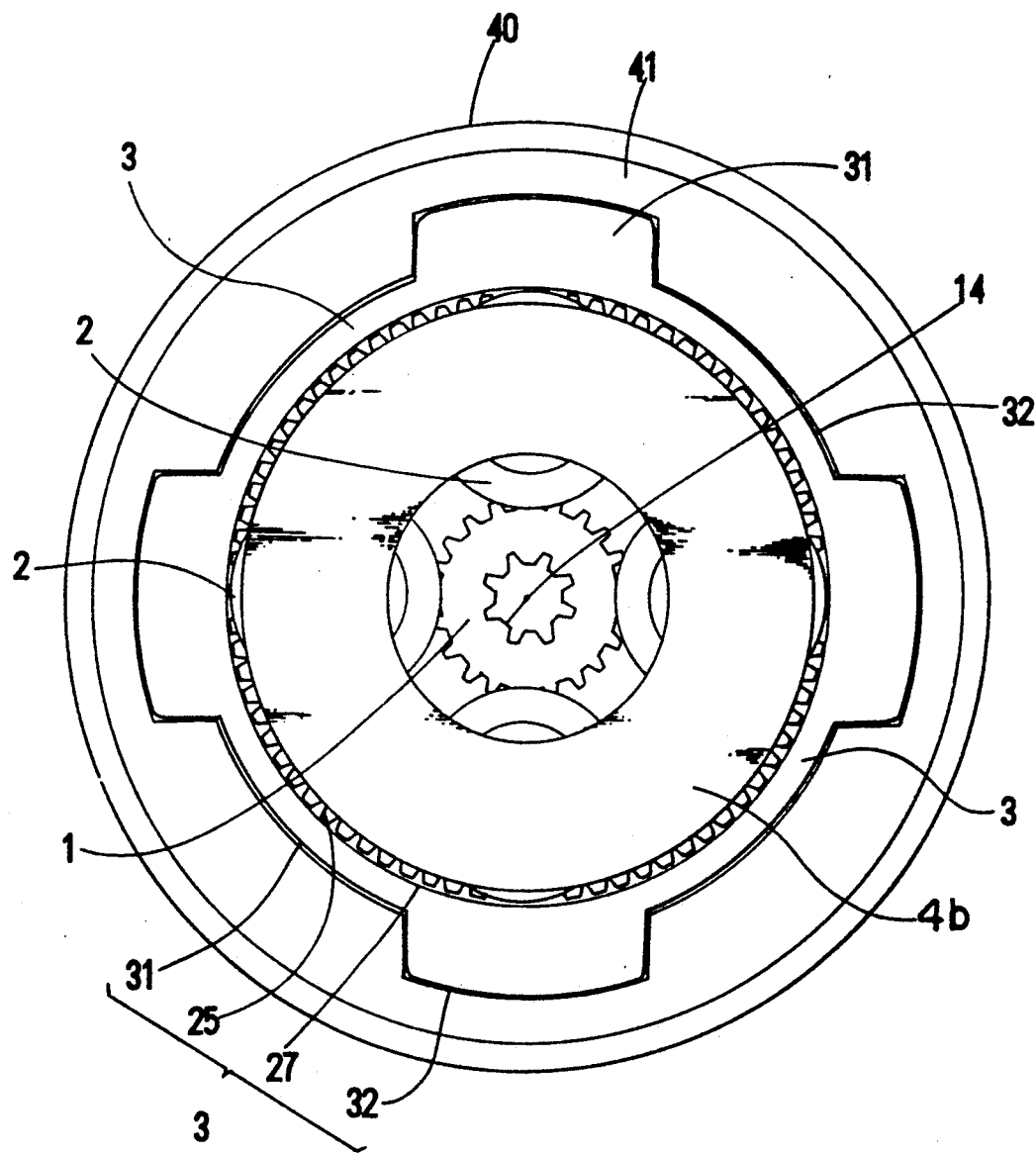

FIG. 9 is a front view of a unified planetary gear assembly fitting a casing.

Figure 10:
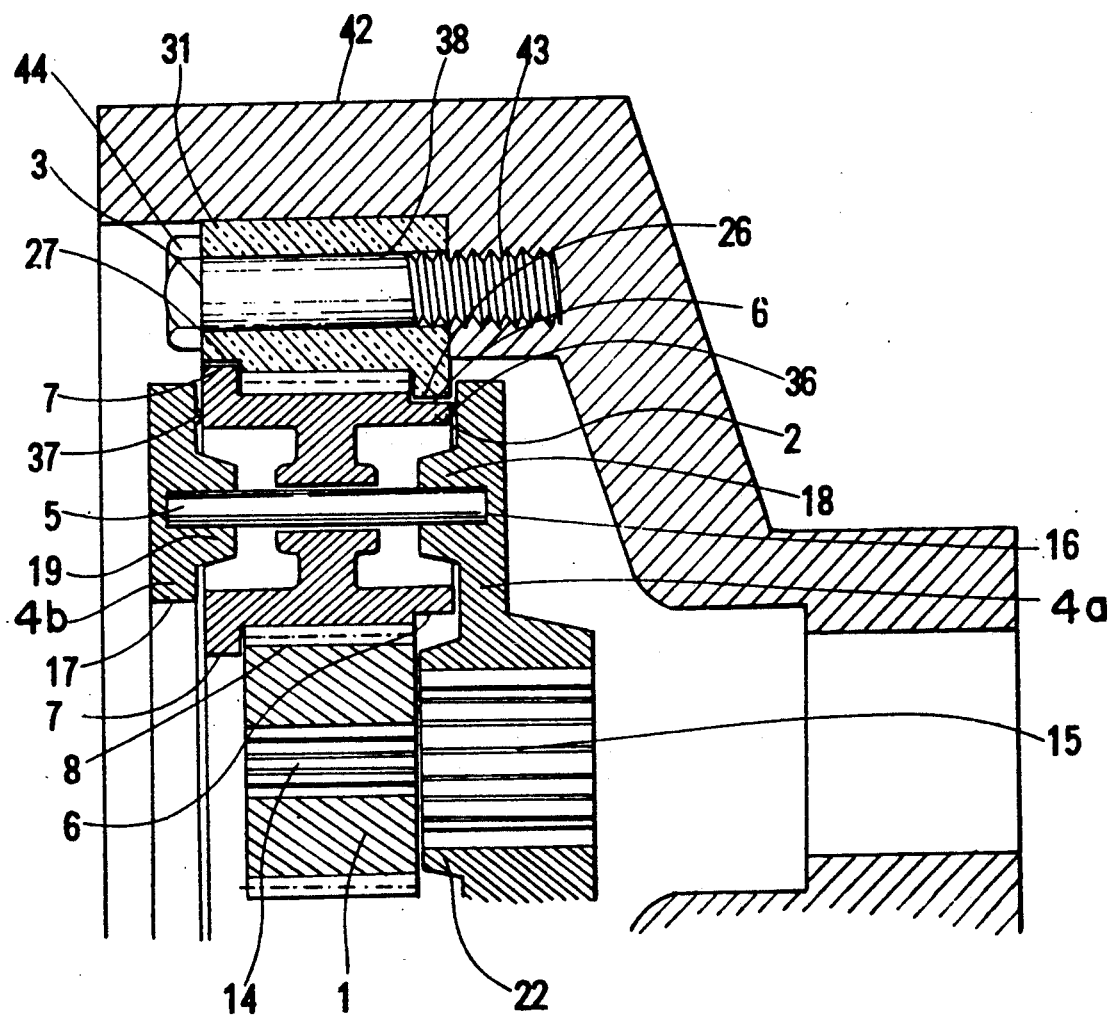

FIG. 10 is a sectional view of nearly half of the planetary gear assembly fitted in a casing.

Figure 11:
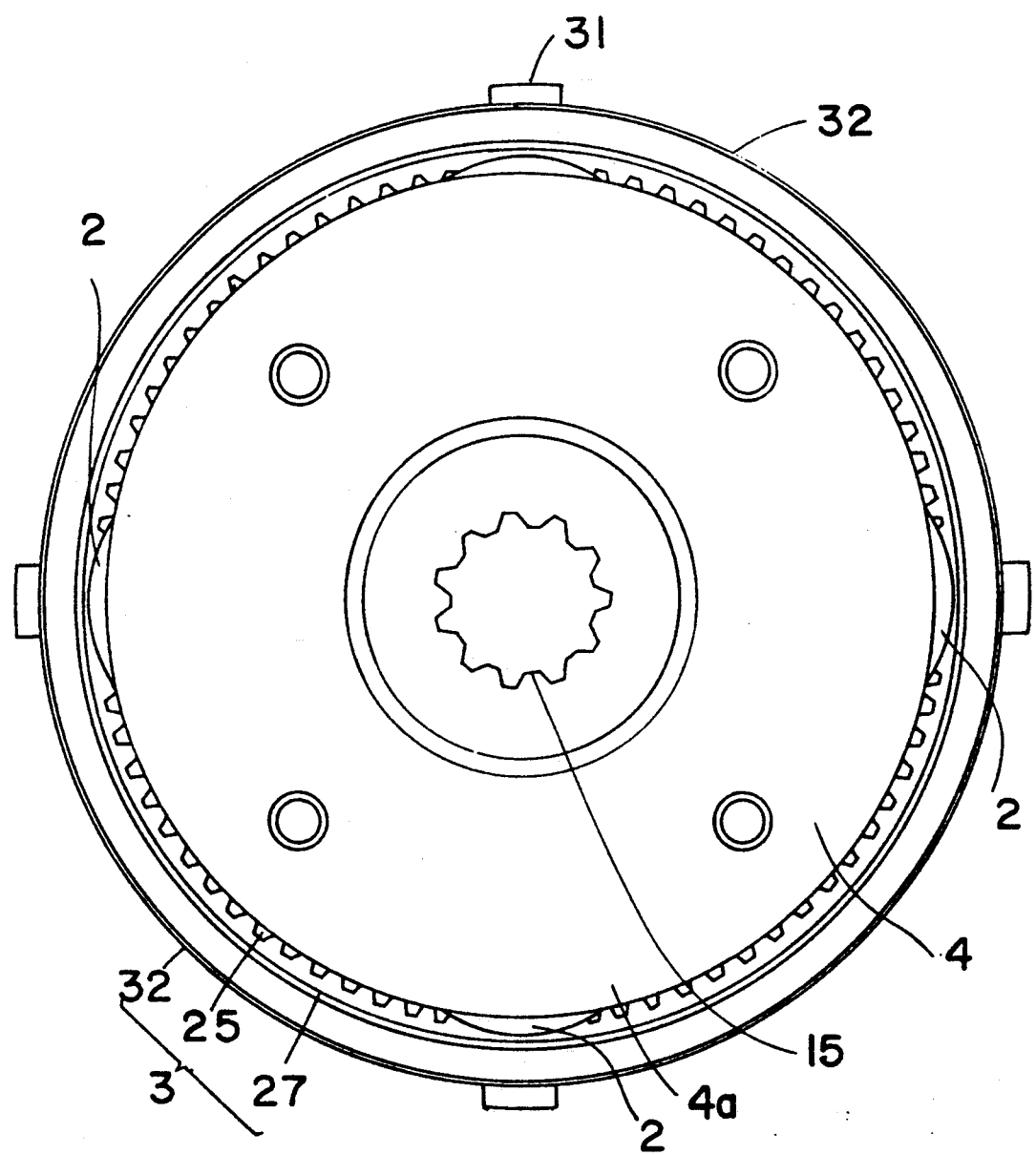

FIG. 11 is a front view of a unified asymmetric planetary gear assembly of another embodiment.

Figure 12:
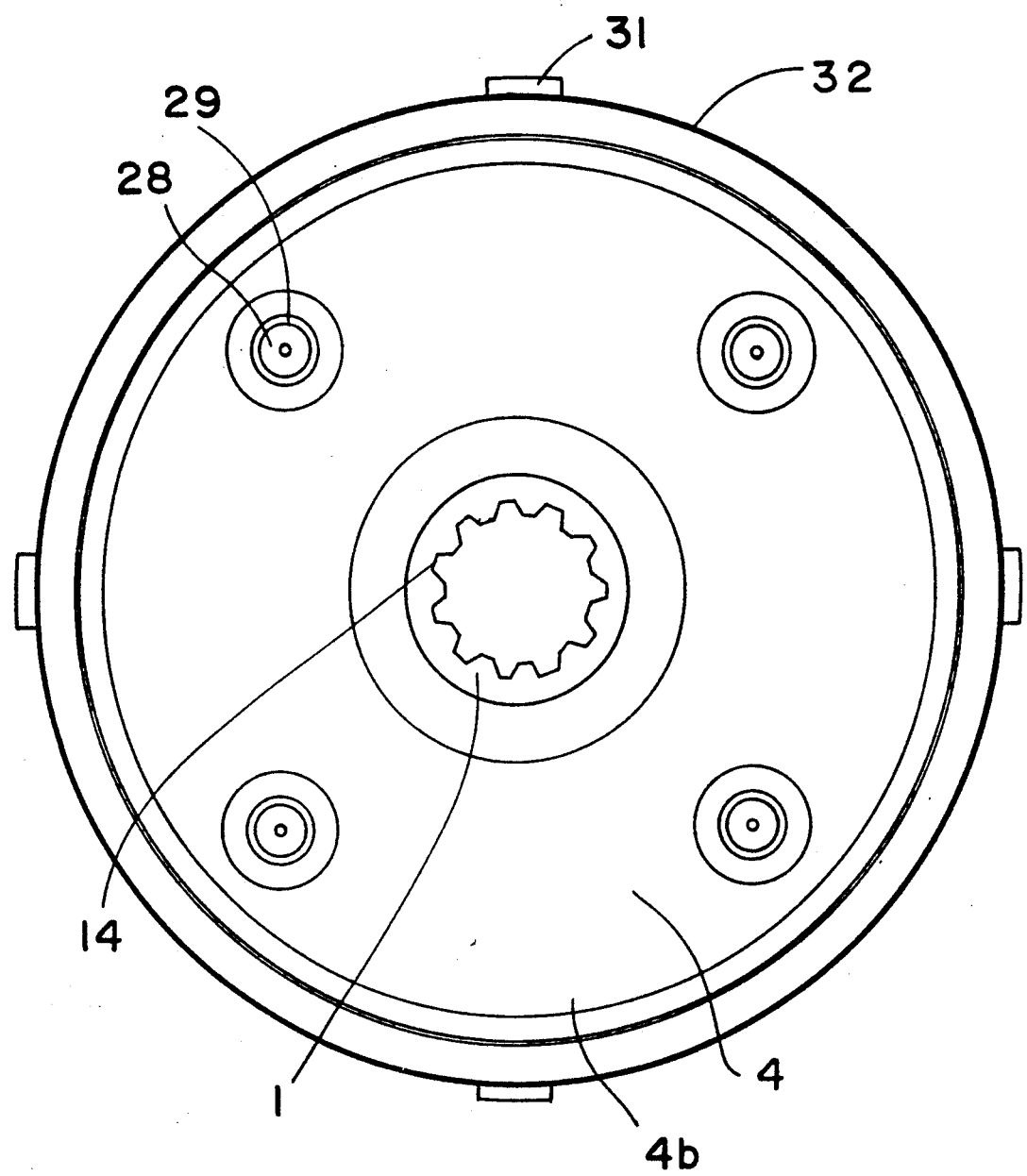

FIG. 12 is a rear view of the embodiment shown by FIG. 11.

DESCRIPTION OF THE PREFERRED EMBODIMENTS

Reference will now be made in detail to the present preferred embodiment of the invention, an example of which is illustrated in the accompanying drawings.

Referring now to the drawings, a unified asymmetric planetary gear assembly comprises a sun gear (1), a plurality of planetary gears (2), an internal gear (3), and a carrier (4).

There is a sun gear (1) in the center of the gear assembly. In this example, four planetary gears (2) enclose and mesh with the sun gear (1). Instead of four, three planetary gears can also be used.

An internal gear (3) encloses and meshes with all the planetary gears.

A carrier (4) is built by connecting a main carrier disc (4a) and a sub-carrier disc (4b) in parallel. The carrier (4) rotatably supports the planetary gears by planetary shafts (5).

The main carrier disc (4a) has four (or three) first convex parts (10) on the inner surface. Correspondingly, the sub-carrier disc (4b) has four (or three) second convex parts (11) on the inner surface.

A plug part (12) is formed on the second convex part (11) of the sub-carrier disc (4b). A socket (13) is fully perforated in the axial direction in the first convex part (10) of the main carrier disc (4a).

To connect the two carrier discs (4a) and (4b), an operator inserts the plug parts (12) of the sub-carrier disc (4b) into the sockets (13) of the main carrier disc (4a) till the ends of the plug parts (12) project out of cavities (29) of the main carrier disc (4a). Then the projecting ends are rolled over. The rolled ends (28) firmly couple the main carrier disc (4a) with the sub-carrier disc (4b).

This method of connection is available if the carrier discs (4a) and (4b) are made from sintered alloy or aluminum die-casting. If the carrier discs (4a) and (4b) are made from plastics, the projecting ends (28) of the plug parts (12) can be welded to the sockets (13) by ultrasonic bonding.

The carrier discs can also be connected in other ways. For instance, the main carrier disc (4a) may include second convex part (11) and plug parts (12), and the sub-carrier disc (4b) may include the first convex parts (10) and sockets (13) axially perforated through the first convex parts.

Four (or three) third convex parts (18) are shaped on the inner surface of the main carrier disc (4a). Shaft-supporting bores (16) are perforated an the axial direction in the third convex parts (18). The third convex parts (18) are positioned at the middle of two neighboring first convex parts (10).

Similarly, four (or three) fourth convex parts (19) are shaped at the middle of two neighboring second convex parts (11) on the sub-carrier disc (4b). Shaft-supporting bores (16) are axially perforated in the fourth convex parts (19).

Both ends of the planetary shafts (5) are inserted and fixed in the shaft-supporting bores (16) of the carrier discs (4a) and (4b).

The shape of the planetary gear is one of novel, important features of this invention. Therefore, it will be explained in detail with reference to FIG. 4 and FIG. 5.

The planetary gear (2) has a planetary gear part (8) in the middle, a planetary smaller disc part (6) and a planetary bigger disc part (7) on opposing sides. Thus, the planetary gear (2) is asymmetric regarding a middle plane vertical to the axial direction.

An inner portion of the planetary gear part (8) connects with a planetary boss (9) through which a shaft bore (21) is axially perforated. A planetary shaft (5) pierces the shaft bore (21) of the planetary gear (2).

The planetary smaller disc part (6) is smaller in radius than the radius of the tooth root circle of the planetary gear part (8). On the contrary, the planetary bigger disc part (7) is bigger in radius than the radius of the tooth edge circle of the planetary gear part (8).

The important matter is that the planetary gear part (8), planetary smaller disc part (6), planetary bigger disc part (7) and planetary boss (9) are constructed from a single body. The planetary gear (2) is not divided in three parts but is unified in a single part. A unified planetary gear is one of the important characteristics of the invention. Such an asymmetric planetary gear is able to be made by plastic injection molding or sintering of powder metal.

In correspondence with the planetary gear, the internal gear (3) also includes three parts. Namely, the internal gear (3) has an internal gear part (25) in the middle, a smaller inner cylindrical part (26) and a bigger inner cylindrical part (27) on opposing sides. The smaller inner cylindrical part (26) has a radius smaller than the radius of the tooth edge circle of the internal gear part (25) and the bigger inner cylindrical part (27) has a radius bigger than the radius of the tooth root circle of the internal gear part (25).

The internal gear part (25) meshes with the planetary gear part (8) to transmit rotation torque thereto. The planetary smaller disc part (6) contacts with and rolls on the smaller inner cylindrical part (26) of the internal gear (3). Of course, there is some clearance between the two rolling surfaces. Sometimes the two parts (6) and (26) touch each other but other times they do not touch.

Similarly, the planetary bigger disc part (7) contacts with and rolls on the bigger inner cylindrical part (27). There is also some clearance between these two rolling surfaces. Sometimes the two parts (7) and (27) touch and other times they do not touch.

Owing to the contact between the planetary smaller disc part (6) and the smaller inner cylindrical part (26) and the contact between the planetary bigger disc part (7) and the bigger inner cylindrical part (27), radial forces are transmitted from the planetary gears (2) to the internal gear (3).

A sun shaft bore (14) is axially perforated through the center of the sun gear (1). A spline, serration, D-shape hole or other coupling device is formed on the inner surface of the sun shaft bore (14).

A boss part (22) of the main carrier disc (4a) is thickened to reinforce it. A carrier shaft bore (15) is axially perforated through the thickened boss part. A spline, serration or other coupling device is formed also on the inner surface of the carrier shaft bore (15).

When the planetary gear assembly is used as a decelerator, an input shaft is inserted into the sun shaft bore (14) and an output shaft is inserted into the carrier shaft bore (15). On the contrary, when the planetary gear assembly is used as an accelerator, an input shaft is inserted into the carrier shaft bore (15) and an output shaft shall be inserted into the sun shaft bore (14).

The internal gear (3) should be mounted in a casing. To prevent the internal gear (3) from rotating with regard to the casing, several radial projections (31) are formed on a smooth cylindrical surface (32) of the internal gear (3). FIG. 9 shows the planetary gear assembly fitted in a casing (40). The casing is shaped to have complementary projections (40) on its inner surface. In this example, the internal gear (3) is rather loosely mounted in the casing. Of course, other kinds of mounting are also available. For instance, by perforating axial bores on the internal gear and the flange of a casing, one can fix the internal gear to the casing by screwing bolts in the bores.

In the embodiment shown in figures, the radial projections (31) axially deviate from a middle plane of the internal gear (3) vertical to the axial direction. The middle plane for receiving torque is axially distanced from a plane on which the radial projections (31) exist.

If a strong torque acts between the internal gear (3) and the casing, the internal gear (3) can distort in a spiral manner between the two planes. Such spiral distortion is effective to absorb and alleviate an abrupt, strong shock.

In the embodiment shown in FIG. 3, third convex parts (8) and fourth convex parts (19) are shaped on the inner surfaces of carrier discs (4a) and (4b) to prevent the planetary gears (2) from displacing axially by holding the planetary boss (19) therebetween.

The planetary bigger disc parts (7) prevent the sun gear (1) from sliding leftward in FIG. 3. The boss (22) of the thickened main carrier disc (4a) prevents the sun gear (1) from sliding out rightward. Thus, the sun gear (1) is kept in a desired axial position.

Furthermore, in this example, the main disc (4a) is larger than the smaller inner cylindrical part (26) of the internal gear (3). This fact prevents the carrier (4) from sliding out of the internal gear (3) leftward.

Another embodiment of this invention is shown in FIG. 6. The fundamental structure of this embodiment is common with the former embodiment. In this embodiment, circular protrusions (36) and (37) are shaped on the inner surfaces of the main carrier disc (4a) and sub-carrier disc (4b). The circular protrusions contact the sides of the planetary gears (2). Thus, they prevent the planetary gears (2) from displacing in an axial direction. Because the sides of the planetary smaller disc part (6) and bigger disc part (7) touch the circular protrusions (36) and (37), the planetary gears (2) are kept in a desired axial position. In this embodiment, bolt holes (38) are perforated in an axial direction. FIG. 10 shows the planetary gear assembly fitted in a casing (42). By inserting bolts in the bolt holes (38) and screwing them into screw holes of a casing, the internal gear (3) is safely fixed on the casing.

The sun gear (1) can be made from plastic, sintered alloy, zinc or steel. The planetary gears (2) can be made from plastic or sintered alloys of powder metal. In spite of the anomalous shape, the planetary gears (2) can be made in a single body by molding plastics or sintered alloys of powdered metal. The carrier (4) can be made from plastic, aluminum, aluminum alloy, sintered alloys of powdered metal, zinc or steel. The internal gear (3) can be made from plastic or sintered alloys of powdered metal.

In the embodiments shown in FIG. 1 to FIG. 6, the planetary smaller disc part (6) neighbors on the main carrier disc (4a) and the planetary bigger disc part (7) neighbors on the sub-carrier disc (4b) to prevent the sun gear (1) from sliding out leftward. This disposition can be safely reversed. FIGS. 11-12 show such an embodiment. In the reversed disposition, the planetary smaller disc part (6) can neighbor on the sub-carrier disc (4b).

The desirable size relation of gears, discs and cylindrical parts will now be explained.

The planetary smaller disc part (6) of the planetary gear (2) is 0 to 2 modules smaller in radius than the radius of the tooth root circle of the planetary gears (2). The planetary bigger disc part (7) is 0 to 2 modules bigger in radius than the radius of the tooth edge circle of planetary gear (2).

The smaller inner cylindrical part (26) of the internal gear (3) is 0 to 2 modules smaller in radius than the radius of the tooth edge circle of the internal gear (3). The bigger inner cylindrical part (27) is 0 to 2 modules bigger in radius than the radius of the tooth root circle of the internal gear (3).

The difference of line velocities at the contact points will be now explained, because the asymmetric character of this invention causes a non-negligible difference of line velocities.

Here "$\Delta$" denotes the difference of radii between the side disc parts or inner cylindrical parts and the pitch circles of the gear parts corresponding thereto. As shown by Eq. (18), the difference of line velocities at the contact points is equal to the difference of angular velocity multiplied by $\Delta$.

The dynamics in a rotating coordinate system where the carrier seems to be at rest will now be considered.

Angular velocities of the planetary gears (2) and the internal gear (3) are denoted by "$\Omega_p$" and "$\Omega_1$", respectively. The difference W of line velocities at the contact points is given by $$W = \Delta(\Omega_p - \Omega_1) \qquad (18)$$

"$Z_p$" and "$Z_1$" are the numbers of teeth of the planetary gear and the internal gear, respectively.

Because the gears are meshing, the line velocities of gears satisfy the relation $$Z_p \Omega_p = Z_1 \Omega_1 \qquad (19)$$

Substituting Eq. (19) into Eq. (18), we obtain the difference of line velocity $$W = \Delta \left( \frac{Z_l}{Z_p} - 1 \right) \Omega_l \qquad (20)$$

In the gear assembly of this invention, the planetary gears (2) have side disc parts with different diameters, the planetary smaller disc parts (6) and planetary bigger disc parts (7), and the internal gear (3) has side inner cylindrical parts with different diameters, the smaller inner cylindrical part (26) and bigger inner cylindrical part (27). There are differences of line velocities on both sides of the gears. Further, the sign of the differences is reciprocal.

The radial deviation of planetary smaller disc part (6) and smaller inner cylindrical part (26) from their pitch circle is denoted by "$-\Delta_s$". $\Delta_1$ is positive.

The difference $W_s$ of line velocities between the planetary smaller disc part (6) and smaller inner cylindrical part (26) is given by $$W_s = -\Delta_s \left( \frac{Z_l}{Z_p} - 1 \right) \Omega_l \qquad (21)$$

Similarly, the radial deviation of the planetary bigger disc part (7) and bigger inner cylindrical part (27) from their pitch circles is denoted by "$\Delta_b$". $\Delta_b$ is positive.

The difference $W_b$ of the line velocities between the planetary bigger disc part (7) and the bigger inner cylindrical parts (27) is given by $$W_b = \Delta_b \left( \frac{Z_l}{Z_p} - 1 \right) \Omega_l \qquad (22)$$

$W_s$ is negative but $W_b$ is positive. These differences of line velocities exist between the disc parts and inner cylindrical parts.

Because the angular velocity $\Omega_1$ is definitely determined by the engagement of gears, slipping by $W_s$ or $W_b$ would occur between the disc parts and inner cylindrical parts.

If the planetary smaller and bigger disc parts (6) and (7) were to always contact with the smaller and bigger inner cylindrical parts (26) and (27) with strong radial forces, the gears would not rotate because of the strong friction occurring from the differences of line velocities.

However, in practice some tolerances are allocated to the disc parts and inner cylindrical parts. Owing to the properly-allocated tolerances, the disc parts do not always contact the corresponding inner cylindrical parts. Indeed, at nearly all times, the disc parts are separated from the inner cylindrical parts. Only when a strong radial force is applied, do the disc parts touch the corresponding inner cylindrical parts. Accordingly, free relative rotation between the disc parts and inner cylindrical parts is allowed when they are separated from each other. Therefore, the planetary gear assembly can smoothly rotate despite the difference of line velocities.

The functions of the planetary gear assembly will now be explained. The planetary gear parts (8) mesh with the internal gear part (25) to transmit rotation torque. The planetary bigger disc parts (7) contact with and roll on the bigger inner cylindrical parts (27) of the internal gear (3). The planetary smaller disc parts (6) contact with and roll on the smaller inner cylindrical parts (26).

Radial forces are transmitted from the side disc parts (6) and (7) to the inner cylindrical part (26) and (27). The contact of the side disc parts and cylindrical parts forbid excess engagement between the planetary gears (2) and the internal gear (3).

Although the line velocities of the disc parts and inner cylindrical parts are different at the rolling points, the difference of line velocities does not hinder a smooth rotation of the gears because of the reasons mentioned above.

The assembly of gears will now be explained.

(1) A sub-carrier disc (4b) is put on a table with the second convex parts (11) facing upward.

Planetary shafts (5) are inserted into the shaft supporting bores (16)

(3) Planetary gears (2) are fitted around the planetary shafts (5) with the planetary bigger disc parts (7) facing downward.

(4) An internal gear (3) is axially inserted around the planetary gears (2) with the bigger inner cylindrical part (27) facing downward.

(5) By rotating the gears slightly, a sun gear (1) is inserted into the center of planetary gears (2).

(6) A main carrier disc (4a) is fitted onto the sub-carrier disc (4b) as the sockets (13) are pierced by the plug parts (12).

(7) Top ends of the plug parts (12) projecting from the cavities (29) are pressed and flattened.

By these operations a planetary gear assembly of the invention is assembled.

The advantages of this invention will now be explained. First of all, a planetary gear is unified. It is constructed by one part instead of three. The reason why the planetary gear can be unified in a body can be understood by referring to FIG. 3, FIG. 5 or FIG. 6. One side of the planetary gear part (8) is a planetary smaller disc part (6), having a radius smaller than the radius of the tooth root circle. Another side of the planetary gear part (8) is a planetary bigger disc part (7) having a radius bigger than the radius of the tooth-edge circle. The peripheral diameter changes progressively in an axial direction.

Despite the anomalous shape, such a planetary gear can be made by injection molding with a pair of metallic molds. The unified planetary gears reduce the cost of manufacturing and assembling the parts.

On the contrary, planetary gears as shown in FIG. 7 or FIG. 8 cannot be molded as a whole, because the peripheral diameter does not change progressively. It is inevitable to have to mold the separate parts and assemble them.

Torque is transmitted by the gear parts (8) and (25). Radial forces are transmitted in two ways one way is between the planetary bigger disc parts (7) and the bigger inner cylindrical part (27) and the other way is between the planetary smaller disc parts (6) and the smaller inner cylindrical part (26).

Radial forces are not transmitted from the gear parts (8) to the gear part (25). Because of the cancellation of the radial forces, the teeth of the gears do not deeply mesh with the teeth of the counterparts in any situation.

Even if strong forces, or other abnormal forces, e.g. forces induced by size errors, are applied to the input or output shafts, the gears can smoothly rotate by the actions of the discs and inner cylindrical surfaces.

Furthermore, unification of the planetary gear reduces noise generation. This is rather an unexpected advantage which has been found by actual examinations.

To test the noise generation, the following examination was tried.

Two types of planetary gear with the same sizes and matter were manufactured. The first type was an embodiment of this invention including unified planetary gears. The second type was one of the prior art, including planetary gears consisting of three parts like Japanese Patent Laying Open No. 61-27337 or No. 60-252845.

The following properties were common to both types. The outer diameter of the internal gear (smooth cylindrical surface (32)) was 75 mm. The module of the gears was 0.75 mm. The reduction radio was 4.8. The number of teeth of the internal, planetary and sun gears were 76, 28 and 20, respectively. The sun gears were made of a sintered alloy of powdered metal. The internal gears were made of nylon.

The planetary gears were made of polyacethal. The planetary gears of the first type (present invention) were molded in a single body. The planetary gears of the second type (prior art) comprise a gear and two discs, all of which were made of polyacethal.

These planetary gear assemblies were mounted in fully-automatic electric washers for testing the noise generation property. Four kilograms of clothes were thrown into each of the electric washers and the electric washers were switched on.

The noise level at a point distanced 1 meter from the electric washers was then measured. Ten samples for each type were accumulated. The average noise generation level of the first type was approximately 47 phons. The average noise generation level of the second type was approximately 50 phons. Thus, the noise level of the first type was approximately three phons lower than that of the second type. This proves that the unification of the planetary gears is also effective to reduce noise generation.

I claim:

1. A unified asymmetric planetary gear assembly comprising:

a sun gear;

a plurality of planetary gears meshing with the sun gear, at least one of the planetary gears including a middle planetary gear part, a planetary smaller disc part on a first side of the middle planetary gear part, the planetary smaller disc part having a radius smaller than a radius of a tooth root circle of the middle planetary gear part, a planetary bigger disc part on a second side of the middle planetary gear part, the planetary bigger disc part having a radius bigger than a radius of a tooth edge circle of the middle planetary gear part, and a planetary boss including an axially extending shaft bore, the middle planetary gear part, the planetary bigger disc part and the planetary boss being unified in a body;

an internal gear meshing with the planetary gears, the internal gear including an internal gear part meshing with the middle planetary gear part, a smaller inner cylindrical part on a first side of the internal gear part, the smaller inner cylindrical part having a radius smaller than a radius of a tooth edge circle of the internal gear part, and a bigger inner cylindrical part on a second side of the internal gear part, the bigger inner cylindrical part having a radius bigger than a radius of a tooth root circle of the internal gear part, the planetary smaller disc part rollingly engageable with the smaller inner cylindrical part and the planetary bigger disc part rollingly engageable with the bigger inner cylindrical part;

a carrier; and a plurality of planetary shafts attached to the carrier for rotatably supporting the planetary gears.

2. A unified asymmetric planetary gear assembly as claimed in claim 1, wherein the planetary smaller disc part is in the range of 0 to 2 modules smaller in radius than the radius of the tooth root circle of the middle planetary gear part, and the smaller inner cylindrical part is in the range of 0 to 2 modules smaller in radius than the radius of the tooth edge circle of the internal gear.

3. A unified asymmetric planetary gear assembly as claimed in claim 1, wherein the planetary bigger disc part is in the range of 0 to 2 modules bigger in radius than the radius of the tooth edge circle of the middle planetary gear part and the bigger inner cylindrical part is in the range of 0 to 2 modules bigger in radius than the radius of the tooth root circle of the internal gear.

4. A unified asymmetric planetary gear assembly as claimed in claim 1, wherein the carrier comprises:

a main carrier disc having a carrier shaft bore for fitting an output shaft; and a sub-carrier disc having an opening, the planetary bigger disc part and the bigger inner cylindrical part being located adjacent the sub-carrier disc.

5. A unified asymmetric planetary gear assembly as claimed in claim 1, wherein the carrier comprises:

a main carrier disc having a carrier shaft bore for fitting an output shaft; and a sub-carrier disc having an opening, the planetary bigger disc part and the bigger inner cylindrical part being located adjacent the main carrier disc.

6. A unified asymmetric planetary gear assembly as claimed in claims 4 or 5, wherein the main carrier disc has an inner boss inwardly projecting from an inner wall for positioning the sun gear in an axial direction.

7. A unified asymmetric planetary gear assembly as claimed in claim 1, wherein the internal gear comprises:

a smooth cylindrical surface; and a plurality of radial projections for preventing relative rotation of the internal gear in a casing, the radial projections lying in a plane axially distanced from a middle plane of the internal gear.

8. A unified asymmetric planetary gear assembly as claimed in claim 1, wherein the planetary gears are made from one of the group of plastics and sintered alloys.

9. A unified asymmetric planetary gear assembly as claimed in claim 1, wherein the carrier comprises:

a main carrier disc having third convex portions projecting inwardly with axial shaft-supporting bores; and a sub-carrier disc having fourth convex portions projecting inwardly with axial shaft-supporting bores, the shaft-supporting bores supporting a first end and a second end of each planetary shaft.

10. A unified asymmetric planetary gear assembly as claimed in claim 1, wherein the sun gear is made from one of the group of plastics, sintered alloys, zinc, steel and quenched steel.

11. A unified asymmetric planetary gear assembly as claimed in claim 1, wherein the carrier is made from one of the group of plastics, fiber-reinforced plastics, aluminum, aluminum alloys, sintered alloys, zinc and steel.

12. A unified asymmetric planetary gear assembly as claimed in claim 1; wherein the carrier comprises inner surface circular protrusions which contact side surfaces of the planetary gears to position the planetary gears in an axial direction.

13. A unified asymmetric planetary gear assembly as claimed in claim 1, wherein the internal gear comprises:

a plurality of fastener bores extending in an axial direction through which fasteners can be inserted for attaching the internal gear to a casing.

14. A unified asymmetric planetary gear assembly as claimed in claim 1, wherein the carrier comprises a main carrier disc having a carrier shaft bore for fitting an output shaft, and a sub-carrier disc with an opening, the planetary bigger disc part and the bigger inner cylindrical part being located on a side adjacent the main carrier disc, wherein the main carrier discs has an inner boss inwardly projecting from an inner wall for preventing the sun gear from displacing in an axial direction.

15. A unified asymmetric planetary gear assembly as claimed in claim 14, wherein interstitial spaces between the planetary gears are enclosed by the inner convex parts of the sub-carrier disc, the inner boss of the main carrier disc and the inner walls of the carrier discs.

* * * * *